United States Patent [19]

Ney et al.

[11] 3,924,014
[45] Dec. 2, 1975

[54] PROVOLONE CHEESE FLAVOR

[75] Inventors: Karl Heinz Ney, Hamburg-Rissen; I. Poetoe Gde Wirotama, Rellingen; Wolfram Gustav Freytag, Halstenbek, all of Germany

[73] Assignee: Lever Brothers Company, New York, N.Y.

[22] Filed: Jan. 24, 1975

[21] Appl. No.: 543,838

Related U.S. Application Data

[63] Continuation-in-part of Ser. No. 345,058, abandoned.

[30] Foreign Application Priority Data

Mar. 24, 1972 Luxembourg ............................. 65039

[52] U.S. Cl. .................. 426/534; 426/535; 426/536; 426/537; 426/538
[51] Int. Cl.² ......................................... A23L 1/226
[58] Field of Search ........................................ 426/65

[56] References Cited
UNITED STATES PATENTS 3,520,699   8/1970   Henning.............................. 426/65

OTHER PUBLICATIONS

Harper et al., Italian Cheese Ripening... J. Dairy Science, 39, (1956), pp. 129–137.
Iyer et al, Improved Technique for Analysis of Free Fatty Acids in Butteroil and Provolone Cheese, J. Dairy Science, 50, (1967), pp. 285–291.
Fenaroli's Handbook of Flavor Ingredients, 1971, Edited by Furia et al, The Chemical Rubber Co., Cleveland, pp. 741–742.

*Primary Examiner*—Joseph M. Golian
*Attorney, Agent, or Firm*—James J. Farrell, Esq.

[57] ABSTRACT

A foodstuff having a flavor in the direction of ripe Provolone cheese can be prepared by incorporating a mixture of i. alkanoic acids having 2–10 carbon atoms, containing 35–70 percent butyric acid, 15–35 percent hexanoic acid, 15–30 percent octanoic and/or decanoic acid, and the balance being other alkanoic acids having 2–10 carbon atoms, ii. alkyl alkanoates having an alkyl group of 1–4 carbon atoms and an alkanoyl group of 4–8 carbon atoms, and iii. alkyl amines and dialkylamines having 2–8 carbon atoms, and optionally other cheese flavor ingredients. The ripe Provolone cheese flavor of a foodstuff is further improved if a mixture of amino acids is added in addition to a flavoring mixture. A preferred flavoring mixture comprises 75–99 parts alkanoic acids, 0.01–0.2 parts alkyl alkanoates, 0.05–0.5 parts alkyl and dialkyl amines and 0.01–20 parts other cheese flavor ingredients.

10 Claims, No Drawings

PROVOLONE CHEESE FLAVOR

This application is a Continuation-in-part of application Ser. No. 345,058, and now abandoned, which claims convention priority of Luxembourg patent application No. 65,039 dated Mar. 24, 1972.

The present invention relates to a process for preparing a foodstuff having a flavor in the direction of Provolone cheese, to cheese flavoring compositions to be used for such a process and to a foodstuff prepared with such a process.

In this specification "Provolone Cheese" is understood to be a hard cheese which is mainly produced in Southern Italy and Lombardy from cow's milk by natural souring. Provolone belongs to the group of the "pastafilata" cheeses, by which are understood cheeses prepared from curd which had been made plastic. In this particular mode of preparation the cheese curd is heated in the whey at temperatures above 60°C, which renders it soft to viscous, so that a plastic, thread-like curd structure is formed.

On account of its intensive flavor. Provolone is popular in Italy for use as an additive in the preparation of special processed cheeses. However, in comparison with other kinds of cheese, e.g. Cheddar, Provolone is relatively expensive.

In spite of the existence of commercial interest, attempts to find a flavoring preparation the addition of which makes it possible to impart to foodstuffs, in particular relatively tasteless young cheese, a ripe Provolone taste and flavor, were not successful so far. As to the individual components which contribute to the flavor and taste of ripe Provolone, little has become known so far in the literature. It is known that the free fatty acids are involved in the taste and smell of dairy produce and in particular also of cheese. It is further known that the proportion of short-chain free fatty acids in Provolone is very high and that among the short-chain free fatty acids butyric acid takes a prominent place (J. Dairy Science 50 (1967) 285–291). In view of the flavor formation also the free amino acid content in Provolone has been investigated and discussed (J. Dairy Science 39 (1956) 129–137).

The problem underlying the present invention is to impart to foodstuffs, preferably cheese products, in particular processed cheese which has been prepared from young, relatively tasteless raw cheese, for example young Cheddar cheese, a flavor and taste of ripe Provolone, by incorporating certain flavoring preparations, without the addition of ripe Provolone being required.

It has now been found that a foodstuff, in particular young cheese, processed cheese and processed cheese preparations with a flavor in the direction of ripe Provolone cheese can be obtained when a food composition is admixed with an effective amount of a Provolone cheese flavoring composition containing alkanoic acids with 2–10 carbon atoms, comprising 35–70 percent butyric acid, 15–35 percent hexanoic acid, 15–30 percent octanoic acid and/or decanoic acid, and the balance being other alkanoic acids with 2–10 carbon atoms.

Preferably the amount of alkanoic acids is such that the concentration of butyric acid in the final foodstuff is at least 500 mg/kg. For an extra piquante type of Provolone cheese product at least 1500 mg/kg butyric acid should preferably be present. The Provolone cheese flavor of a foodstuff is further improved if a food composition is admixed with a Provolone cheese flavoring composition containing alkyl alkanoates of the formula $R^1$—CO—O—$R^2$ having an alkyl group $R^2$ with 1–4 carbon atoms and an alkanoyl group $R^1$—CO— having 4–8 carbon atoms, and/or containing alkyl amines and dialkyl amines having 2–8 carbon atoms. If a Provolone cheese flavoring composition is used containing alkyl amines having 3–5 carbon atoms, this is a particular embodiment of the invention described in our co-pending application Ser. No. 407,701, and now abandoned, a Continuation-in-part of application Ser. No. 240,816, now abandoned, claiming priority of Luxembourg patent applications No. 62,955 and No. 62,954 of Apr. 8th 1971.

Effective amounts of Provolone cheese flavoring compositions are in the range of from 100 to 30,000 mg/kg, preferably from 600 to 10,000 mg/kg. The Provolone cheese flavoring composition can be improved by small amounts of other cheese flavoring ingredients. A preferred Provolone cheese flavoring composition is one prepared by admixing from 75 to 99 parts, preferably from 90 to 98 parts, alkanoic acids having from 2 to 10 carbon atoms, consisting of from 35 to 70 percent butyric acid, from 15 to 35 percent hexanoic acid, from 15 to 30 percent of an alkanoic acid selected from the group consisting of octanoic acid, decanoic acid and mixtures thereof, and the balance being other alkanoic acids with from 2 to 10 carbon atoms, from 0.01 to 0.2 parts, preferably from 0.03 to 0.1 parts alkyl alkanoates having an alkyl group with from 1 to 4 carbon atoms and an alkanoyl group with from 4 to 8 carbon atoms, from 0.05 to 0.5 parts, preferably from 0.07 to 0.2 parts alkyl amines and dialkyl amines having from 2 to 8 carbon atoms, and from 0 to 20 parts, preferably from 1 to 10 parts, other cheese flavoring ingredients, such as 2-alkanones with from 4 to 11 carbon atoms, aldehydes with from 2 to 5 carbon atoms, primary and secondary aliphatic alcohols with from 2 to 10 carbon atoms, diacetyl, phenylacetaldehyde, methional, dimethylsulfide, indole, skatole and 5-alkanolides having from 8 to 16 carbon atoms.

The Provolone taste of a foodstuff is further intensified if a mixture of amino acids is admixed with the food composition. It has been found that an effective and commercially attractive mixture is one which comprises glutamic acid, glycine, lysine and methionine. It is preferred that such a mixture contains not more than 10 percent of amino acids other than glutamic acid, glycine, lysine and methionine. Instead of the amino acids their salts can be used. A preferred mixture to be used for improving the Provolone cheese flavor of a foodstuff comprises from 40 to 60 percent sodium glutamate, from 5 to 25 percent glycine, from 10 to 40 percent lysine. HCl, from 5 to 20 percent methionine and from 0 to 10 percent by weight of other amino acids admixed with the food composition in an amount of from 400 to 60,000 mg of amino acids per kg of said food composition.

If a mixture of the above described amino acids is admixed with a food composition containing no free amino acids, the relative proportions of glutamic acid, glycine, lysine and methionine in the food composition will become (35–52):(5–25):(8–32):(5–20). If a mixture of amino acids is added to a food composition already containing free amino acids it is preferred that the amino acids are admixed with the food composition in such amounts that the relative proportions of glutamic acid, glycine, lysine and methionine in the foodstuff are also in this range of (35–52):(5–25):(8–32):(5–20). It is further preferred that the amount of amino acids is such that in the final foodstuff at least one, but more preferably at least three, of glutamic acid, glycine, lysine and methionine are present in a concentration which is at least twice as large as that of each amino acid present in the foodstuff other than glutamic acid, glycine, lysine and methionine. Good results have been obtained in a process for preparing a foodstuff having a Provolone cheese flavor when the mixture of amino acids was added in an amount of from 400 to 60,000 mg/kg, preferably from 1,000 to 20,000 mg/kg. It will be clear that the lower amounts are used when the food composition contains already an appreciable amount of amino acids, for example, when a young Cheddar cheese of 6-10 weeks old is used as a starting material in the preparation of a processed cheese having a Provolone cheese flavor.

It has been found that for obtaining a product with an intensive and rounded Provolone flavor both a Provolone cheese flavoring composition and a mixture of amino acids should be added.

The addition of amino acids for improving the ripe Provolone cheese flavor is an embodiment of the invention described in our co-pending application Ser. No. 407,702, and now abandoned, a Continuation-in-part of application Ser. No. 240,811, now abandoned, claiming priority of Luxembourg patent application 62,953, filed Apr. 8, 1971.

Suitable alkanoic acids with from 2 to 10 carbon atoms are acetic acid, propionic acid, butyric acid, pentanoic acid, hexanoic acid, heptanoic acid, octanoic acid, nonanoic acid and decanoic acid. Selected mixtures of acids such as, for example, a mixture of octanoic and decanoic acids containing about equal amounts by weight of each may be utilized; quantitatively, butyric acid and hexanoic acid predominate in the Provolone cheese flavoring composition.

Suitable alkyl alkanoates having an alkyl group with from 1 to 4 carbon atoms and an alkanoyl group with 4–8 carbon atoms are methyl, ethyl, propyl and butyl esters of butyric acid, pentanoic acid, hexanoic acid, heptanoic acid and octanoic acid.

Suitable alkyl amines and dialkyl amines with from 2 to 8 carbon atoms comprise ethyl amine, isopropyl amine (2-amino-propane), isobutyl amine (1-amino-2-methylpropane), 1-amino-3-methylbutane, hexyl amine, dimethyl amine, dipropyl amine and dibutyl amine.

Butanone, 2-pentanone, 2-heptanone, 2-nonanone and 2-undecanone have proved to be satisfactory representatives of the group of 2-alkanones with 4-11 carbon atoms.

Suitable alkanals with from 2 to 5 carbon atoms are ethanal, propanal, butanal, pentanal, 2-methylpropanal, 2-methylbutanal and 3-methylbutanal.

Suitable primary and secondary aliphatic alcohols with from 2 to 10 carbon atoms are ethanol, propanol, isobutanol, 2-butanol, 2-pentanol, 2-heptanol, 2-nonanol and 1-octen-3-ol. The secondary alcohols, in particular 1-octen-3-ol, are at least partly present as racemic mixtures.

Suitable 5-alkanolides having from 8 to 16 carbon atoms are 5-decanolide (δ-decalactone) and 5-dodecanolide (δ-dodecalactone).

Among the food compositions to which a ripe Provolone flavor is imparted according to the invention by incorporation of the present flavoring compositions, the first place is given to cheese products, in particular processed cheese which is prepared from young, relatively tasteless raw cheese, preferably young Cheddar cheese, and further to processed cheese preparations, fresh cheese, margarine cheese and creamed cheeses, cheese fondu, cheese powder or suchlike. However, the present flavoring compositions can also be incorporated into other foodstuffs in which a cheese flavor is advantageous, as for example soups, sauces, pies, sandwich spreads, cheese pastries, pizza or similar foodstuffs. The process according to the invention preferably serves for the flavoring of cheese products consisting entirely or partly of nonripened or not fully ripened cheese.

In this specification the term flavor relates to both taste and smell. Percentages and parts are by weight unless otherwise indicated.

In the following Examples the invention is further illustrated without being limited thereto.

EXAMPLE I

A Provolone cheese flavoring composition was prepared by mixing of

| | | | |
|---|---|---|---|
| acetic acid | 150 | hexanoic acid | 3000 |
| propionic acid | 20 | heptanoic acid | 25 |
| butyric acid | 4000 | octanoic acid | 1000 |
| pentanoic acid | 40 | decanoic acid | 1150 |
| methyl hexanoate | 0.5 | ethyl hexanoate | 2.5 |
| ethyl butanoate | 1.0 | ethyl octanoate | 1.0 |
| ethyl amine (33%) | 1.0 | 1-amino-3-methyl-butane | 1.0 |
| hexyl amine | 2.0 | dimethyl amine (40%) | 1.0 |
| 2-amino-propane | 1.0 | dipropyl amine | 1.0 |
| butanone | 2.3 | ethanal | 30.0 |
| 2-pentanone | 0.9 | propanol | 15.0 |
| 2-heptanone | 1.3 | butanal | 15.0 |
| 2-nonanone | 1.6 | pentanal | 15.0 |
| 2-undecanone | 0.9 | 3-methylbutanal | 7.5 |
| ethanol | 80.0 | phenyl-acetaldehyde | 7.5 |
| isobutanol | 45.0 | 5-decanolide | 18.0 |
| 1-octen-3-ol | 5.0 | 5-dodecanolide | 18.0 |
| methional | 1.0 | indole | 2.0 |
| diacetyl | 15.0 | skatole | 2.0 |
| dimethylsulfide | 1.0 | | |

The figures indicate parts by weight.

EXAMPLE II 100 g of a young, non-ripened Cheddar cheese were mixed with 2,000 mg/kg of a flavoring composition according to Example I. A product was obtained which showed a distinct Provolone-like flavor.

EXAMPLE III 100 g of a young, non-ripened cheese were flavored as in Example II, but additionally mixed with 6,000 mg/kg of an amino acid mixture prepared by mixing 500 parts mono-sodium L-glutamate, 200 parts glycine, 200 parts lysine. HCl and 100 parts DL-methionine. A product was obtained having a rounded Provolone flavor.

EXAMPLE IV

From 100 g Cheddar cheese, 64 g water and 3 g melting salt consisting of a commercial mixture of polyphosphates, a processed cheese was prepared in a casserole with stirring and careful heating at 80°C. Stirring at 80°C was continued for 10 min., after which 2,000 mg/kg of the flavoring composition according to Example I was added to the cooling melt. A processed cheese was obtained having a Provolone flavor, which, however, was not yet fully rounded.

EXAMPLE V

A processed cheese was prepared as in Example II, but with addition of 4,500 kg/kg of the flavoring composition according to Example I and 16.000 mg/kg of the amino acid mixture described in Example III. The product obtained possessed an excellent rounded flavor like a processed cheese prepared with Provolone.

EXAMPLE VI 100 g of a young Cheddar cheese were worked up in the conventional way to a processed cheese preparation with addition of 25 percent whey powder and 18,000 mg/kg of the amino acid mixture described in Example III, as set out in Example IV, and, on cooling of the melt, intensively mixed with 2,000 mg/kg of the flavoring composition according to Example I. The finished product possessed an excellent rounded flavor like a commercial processed cheese preparation manufactured by partly using Provolone.

EXAMPLE VII a. A processed cheese was prepared as in Example V, but the decanoic acid in the flavoring composition of Example I was completely substituted by octanoic acid. The product obtained had the typical flavor of a processed cheese made from ripe Provolone cheese, but was slightly milder than the product of Example V. b. A processed cheese was prepared as in Example V, but octanoic acid in the flavoring composition of Example I was completely substituted by decanoic acid. The product obtained had the typical flavor of a processed cheese made from ripe Provolone cheese, but had a slight soapy note as compared to Example V.

EXAMPLE VIII a. A processed cheese was prepared as in Example V, but the decanoic acid in the flavoring composition of Example I was omitted. The product obtained had a slightly milder Provolone cheese flavor than that of Example V.

b. A processed cheese was prepared as in Example V, but the octanoic acid in the flavoring composition of Example I was omitted. The product obtained had a more soapy taste than that of Example VIIIa, but was still weaker than Example V.

Examples V, VII and VIII show that either octanoic acid or decanoic acid or a mixture thereof can be used.

EXAMPLE IX

A processed cheese was prepared as in Example V with a flavoring composition comprising only fatty acids, esters and amines in the amounts of Example I. The product obtained had a typical flavor of a processed cheese made from ripe Provolone cheese, but was not so rounded as the product from Example V.

What is claimed is:

1. A process for imparting an improved ripe Provolone cheese flavor to a food composition selected from the group consisting of processed cheese, processed cheese preparations, fresh cheese, margarine cheese, creamed cheese, cheese fondu, and cheese powder, which comprises:
   a. preparing a Provolone cheese flavoring composition by admixing
      i. from 75 to 99 parts by weight of alkanoic acids having from 2 to 10 carbon atoms and consisting of from 35 to 70 percent by weight of butyric acid, from 15 to 35 percent by weight of hexanoic acid, from 15 to 30 percent by weight of an alkanoic acid selected from the group consisting of octanoic acid, decanoic acid and mixtures thereof, and the balance being other alkanoic acids having from 2 to 10 carbon atoms;
      ii. from 0.01 to 0.2 parts by weight of alkyl alkanoates having an alkyl group with from 1 to 4 carbon atoms and an alkanoyl group with from 4 to 8 carbon atoms;
      iii. from 0.05 to 0.5 parts by weight of alkyl amines and dialkyl amines having from 2 to 8 carbon atoms; and
      iv. from 0 to 20 parts by weight of other cheese flavoring ingredients selected from the group consisting of 2-alkanones having from 4 to 11 carbon atoms, aldehydes having from 2 to 5 carbon atoms, primary and secondary aliphatic alcohols having from 2 to 10 carbon atoms, diacetyl, phenylacetaldehyde, methional, dimethylsulfide, indole, skatole, and 5-alkanolides having from 8 to 16 carbon atoms; and
   b. admixing the mixture obtained by step (a) with said food composition in an amount of from 100 to 30,000 mg of cheese flavoring composition per kg of foodstuff.

2. A process according to claim 1, in which additionally a mixture of amino acids, consisting of from 40 to 60 percent by weight of sodium glutamate, from 5 to 25 percent by weight of glycine, from 10 to 40 percent by weight of lysine. HCl, from 5 to 20 percent by weight of methionine and from 0 to 10 percent by weight of other amino acids, is admixed with the food composition in an amount of from 400 to 60,000 mg of amino acids per kg of said food composition.

3. A Provolone cheese flavoring composition, prepared by admixing:
   i. from 75 to 99 parts by weight of alkanoic acids having from 2 to 10 carbon atoms and consisting of from 35 to 70 percent by weight of butyric acid, from 15 to 35 percent by weight of hexanoic acid, from 15 to 30 percent by weight of an alkanoic acid selected from the group consisting of octanoic acid, decanoic acid and mixtures thereof, and the balance being other alkanoic acids having from 2 to 10 carbon atoms;
   ii. from 0.01 to 0.2 parts by weight of alkyl alkanoates having an alkyl group with from 1 to 4 carbon atoms and an alkanoyl group with from 4 to 8 carbon atoms;

iii. from 0.05 to 0.5 parts by weight of alkyl amines and dialkyl amines having from 2 to 8 carbon atoms; and iv. from 0 to 20 parts by weight of other cheese flavoring ingredients selected from the group consisting of 2-alkanones having from 4 to 11 carbon atoms, aldehydes having from 2 to 5 carbon atoms, primary and secondary aliphatic alcohols having from 2 to 10 carbon atoms, diacetyl, phenylacetaldehyde, methional, dimethylsulfide, indole, skatole, and 5-alkanolides having from 8 to 16 carbon atoms.

4. A foodstuff prepared by a process according to claim 1.

5. A foodstuff according to claim 4, containing additionally glutamic acid, glycine, lysine and methionine in relative proportions of (35–52):(5–25):(8–32):(5–20), and whereby each of at least three of these amino acids is present in a concentration which is at least twice as large as that of each amino acid present in the foodstuff other than glutamic acid, glycine, lysine and methionine.

6. A process for imparting an improved ripe Provolone cheese flavor to a food composition selected from the group consisting of processed cheese, processed cheese preparations, fresh cheese, margarine cheese, creamed cheese, cheese fondu, and cheese powder, which comprises:

a. preparing a Provolone cheese flavoring composition by admixing
   i. from 75 to 99 parts by weight of alkanoic acids having from 2 to 10 carbon atoms and consisting of from 35 to 70 percent by weight of butyric acid, from 15 to 35 percent by weight of hexanoic acid, from 15 to 30 percent by weight of octanoic acid and decanoic acid in about equal amounts, and the balance being other alkanoic acids having from 2 to 10 carbon atoms;
   ii. from 0.01 to 0.2 parts by weight of alkyl alkanoates having an alkyl group with from 1 to 4 carbon atoms and an alkanoyl group with from 4 to 8 carbon atoms;
   iii. from 0.05 to 0.5 parts by weight of alkyl amines and dialkyl amines having from 2 to 8 carbon atoms; and
   iv. from 0 to 20 parts by weight of other cheese flavoring ingredients selected from the group consisting of 2-alkanones having from 4 to 11 carbon atoms, aldehydes having from 2 to 5 carbon atoms, primary and secondary aliphatic alcohols having from 2 to 10 carbon atoms, diacetyl, phenylacetaldehyde, methional, dimethylsulfide, indole, skatole, and 5-alkanolides having from 8 to 16 carbon atoms; and b. admixing the mixture obtained by step (a) with said food composition in an amount of from 100 to 30,000 mg of cheese flavoring composition per kg of foodstuff.

7. A process according to claim 6, in which additionally a mixture of amino acids, consisting of from 40 to 60 percent by weight of sodium glutamate, from 5 to 25 percent by weight of glycine, from 10 to 40 percent by weight of lysine. HCl, from 5 to 20 percent by weight of methionine and from 0 to 10 percent by weight of other amino acids, is admixed with the food composition in an amount of from 400 to 60,000 mg of amino acids per kg of said food composition.

8. A Provolone cheese flavoring composition, prepared by admixing:

i. from 75 to 99 parts by weight of alkanoic acids having from 2 to 10 carbon atoms and consisting of from 35 to 70 percent by weight of butyric acid, from 15 to 35 percent by weight of hexanoic acid, from 15 to 30 percent by weight of octanoic acid and decanoic acid in about equal amounts, and the balance being other alkanoic acids having from 2 to 10 carbon atoms;

ii. from 0.01 to 0.2 parts by weight of alkyl alkanoates having an alkyl group with from 1 to 4 carbon atoms and an alkanoyl group with from 4 to 8 carbon atoms;

iii. from 0.05 to 0.5 parts by weight of alkyl amines and dialkyl amines having from 2 to 8 carbon atoms; and iv. from 0 to 20 parts by weight of other cheese flavoring ingredients selected from the group consisting of 2-alkanones having from 4 to 11 carbon atoms, aldehydes having from 2 to 5 carbon atoms, primary and secondary aliphatic alcohols having from 2 to 10 carbon atoms, diacetyl, phenylacetaldehyde, methional, dimethylsulfide, indole, skatole, and 5-alkanolides having from 8 to 16 carbon atoms.

9. A foodstuff prepared by a process according to claim 6.

10. A foodstuff according to claim 9, containing additionally glutamic acid, glycine, lysine and methionine in relative proportions of (35–52):(5–25):(8–32):(5–20), and whereby each of at least three of these amino acids is present in a concentration which is at least twice as large as that of each amino acid present in the foodstuff other than glutamic acid, glycine, lysine and methionine.

* * * * *